Feb. 27, 1962 J. C. BOONSHAFT ETAL 3,022,800

PNEUMATIC TRANSMITTER AND RECEIVER

Filed Sept. 8, 1953 7 Sheets-Sheet 1

INVENTOR.
JULIUS C. BOONSHAFT.
EDMUND D. HAIGLER.
BY
Leonard L. Kalish
ATTORNEY.

PNEUMATIC TRANSMITTER AND RECEIVER

Filed Sept. 8, 1953 7 Sheets-Sheet 2

INVENTOR.
JULIUS C. BOONSHAFT.
EDMUND D. HAIGLER.
BY
Leonard L. Kalish
attorney.

Feb. 27, 1962 J. C. BOONSHAFT ETAL 3,022,800

PNEUMATIC TRANSMITTER AND RECEIVER

Filed Sept. 8, 1953 7 Sheets-Sheet 3

INVENTOR.
JULIUS C. BOONSHAFT.
EDMUND D. HAIGLER.

BY Leonard L. Kalish

ATTORNEY.

PNEUMATIC TRANSMITTER AND RECEIVER

Filed Sept. 8, 1953 7 Sheets-Sheet 4

INVENTOR.
JULIUS C. BOONSHAFT.
EDMUND D. HAIGLER.
BY Leonard L. Kalish
ATTORNEY.

INVENTOR.
JULIUS C. BOONSHAFT.
EDMUND D. HAIGLER
BY Leonard L. Kalish
ATTORNEY.

PNEUMATIC TRANSMITTER AND RECEIVER

Filed Sept. 8, 1953

INVENTOR.
JULIUS C. BOONSHAFT
EDMUND D. HAIGLER
BY
Leonard L. Kalish
ATTORNEY.

INVENTOR.
JULIUS C. BOONSHAFT.
EDMUND D. HAIGLER.
BY
Leonard L. Kalish
ATTORNEY.

United States Patent Office 3,022,800

Patented Feb. 27, 1962

3,022,800

PNEUMATIC TRANSMITTER AND RECEIVER

Julius C. Boonshaft and Edmund D. Haigler, Hatboro, Pa., assignors to Fischer & Porter Company, Hatboro, Pa., a corporation of Pennsylvania Filed Sept. 8, 1953, Ser. No. 382,155
(Filed under rule 47(a) and 35 U.S.C. 116)
4 Claims. (Cl. 137—790)

The present invention relates to pneumatic-mechanical converters, such as pneumatic transmitters and receivers.

The object of the transmitter of the present invention is to translate a mechanical motion representing a measurement of a process-variable or representing the set-point value of such variable, such as rate-of-flow, temperature, pressure, etc. into a pneumatic pressure proportional to the measurement represented by such motion. The pneumatic pressure so produced, and generally referred to as the "output" pressure, may then be conveyed (by small-diameter tubing) to any remote location, where it can be applied to any pneumatic controller having pneumatic measurement-input means, or may be connected, at such remote point, with a pneumatic receiver, such as shown in FIGURES 25 to 32, inclusive, of the accompanying drawings forming a part of this application, whereby such "output" pressure is translated into a mechanical motion which can then be applied to a pen-arm of a recorder or to an indicator-pointer of a visible indicator, or to the measurement-input arm or lever of a pneumatic controller having mechanical measurement input means.

It is an object of this invention to provide a bellows-and-spring-pressure measuring element, in which the spring is a firmlv clamped coiled cantilever type spring, punched from flat sheet stock, and consequently suited especially to fabrication from spring materials of low temperatures modulus.

It is also an object of this invention to preform the punched spring to an initial form which will give a desired spring curve, such as a slight bow or S, to compensate for external linkage errors.

It is still another object of this invention to provide for easy change of range, by substitution of the coiled cantilever spring system and/or the measuring bellows.

It is a further purpose of this invention to provide through the spring, for guiding of the measuring bellows; of course without errors producing sliding friction.

It is also a purpose of this invention to provide a convenient under range stop for suppressed ranges, such as the standard 3 to 15 pounds per square inch transmission range, in which the lower scale limit is above, often well above, zero gauge-pressure.

A typical construction is described in the following specification and shown in the accompanying drawings, in which like figures represent like parts, as follows.

Figure 1:
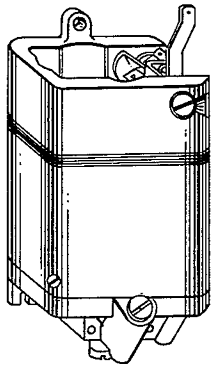
FIGURE 1 represents a perspective view of a transmitter embodying the present invention.

The transmitter of the present invention may be of sectional construction, and (as shown in FIGURES 1, 2, 3, 15 and 24) includes a relay section 1, a bellows-housing 2, a bellows-assembly 3, a spring-assembly 4, and a mechanical input and pilot section 5, assembled in a rigid stack by two short screws 6 from the bottom and two short screws 6 from the top, and six long screws 7. Release of the section 5 without disturbing the rest of the assembly is possible by removing the six screws 7. Release of the relay section 1 requires removal of the screws 7 and the lower screws 6, which also release the section 5.

Alternatively, two through-screws 7 may be replaced with short screws 6 at the bottom, and two longer screws placed at the top, of a length intermediate the lengths of the screws 7 and 6, with their heads seated in section 5 and their stems threaded into bellows-housing 2; similarly to screws 7. With this construction the relay section 1 is alone released by removing the bottom screws 6 and the bottom screws 7. Section 5 alone is released by removing four top screws 6 and the two top screws 7 of the aforementioned intermediate length. Spring section 4 and bellows section 3 can be separated by also removing the top screws 7, without disturbing relay section 1.

Figures 2, 3:
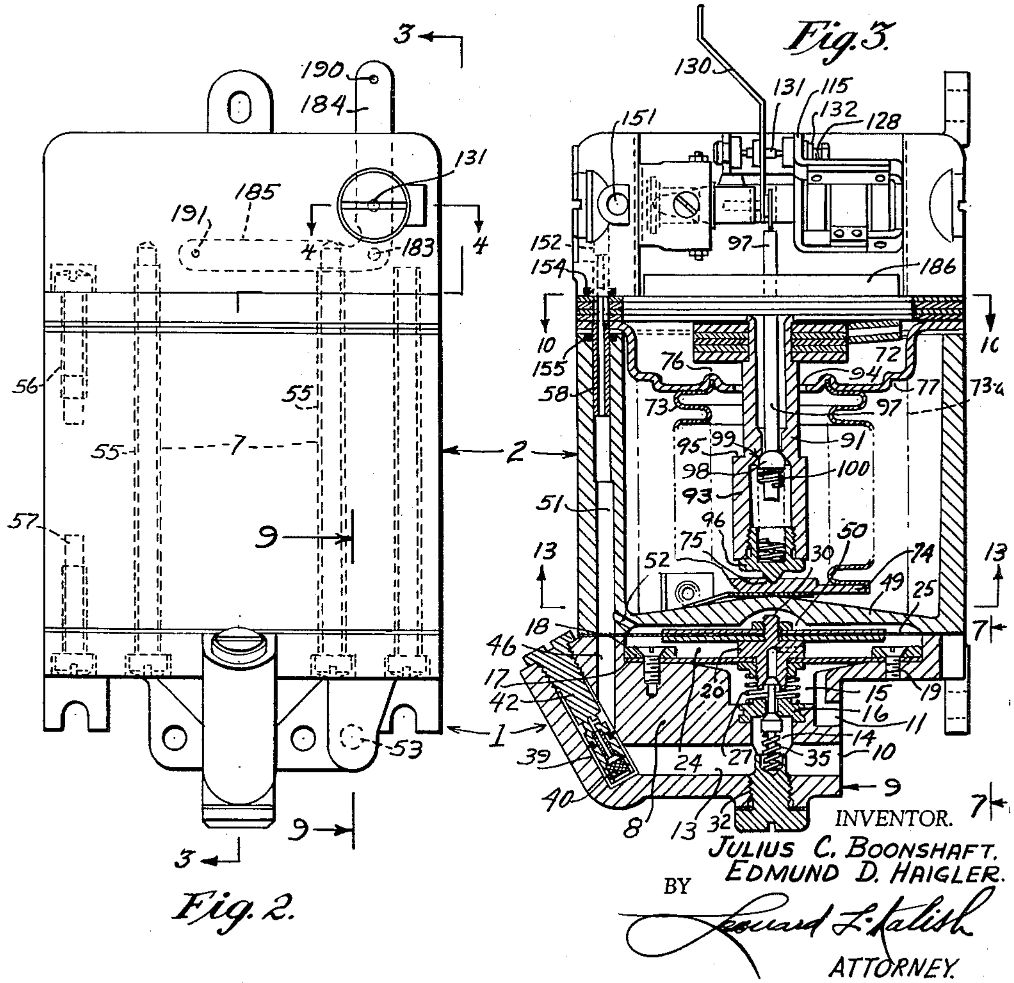
FIGURE 2 represents a front elevational view of the transmitter shown in FIGURE 1.
FIGURE 3 represents a vertical cross-sectional view of the transmitter shown in FIGURE 1 taken generally on line 3—3 of FIG. 2.
Figure 5:
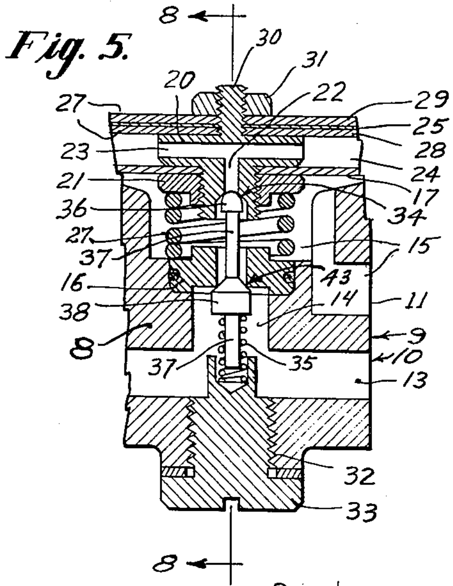
FIGURE 5 represents an enlarged fragmentary cross-sectional view of the relay valves shown in FIGURE 3.
Figure 6:
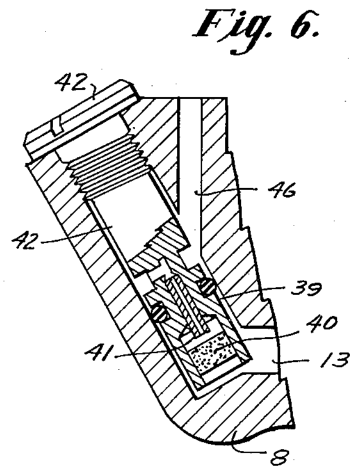
FIGURE 6 represents an enlarged fragmentary cross-sectional view of portions of the relay shown in FIGURE 3.
Figure 8:
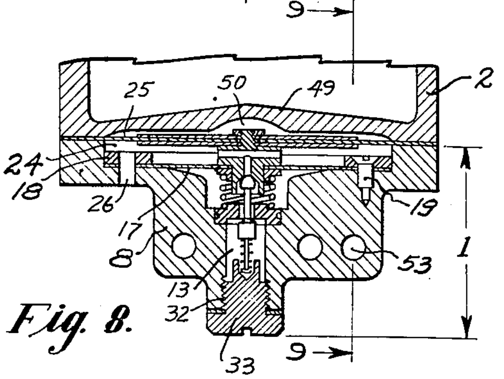
FIGURE 8 represents a fragmentary cross-sectional view on line 8—8 of FIGURE 5.
Figure 7:
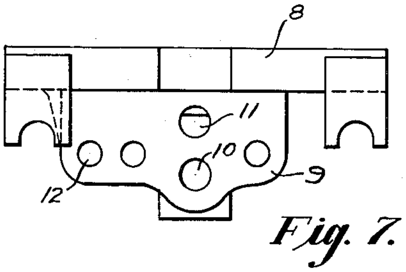
FIGURE 7 represents an elevational view of the relay-section (1), view on line 7—1 of FIGURE 3.

The relay section 1 includes a housing or main body member 8 in whose ported face 9 the air-supply port 10 and the output port 11 and the feed-back port 12 are formed (FIGURES 3, 5, 7, 8, 9 and 24). The air-supply port 10 is the terminus, in the relay body 8, of the supply passageway 13. A valve-passageway 14 is extended within the body 8 transversely of the supply passageway 13 and communicates with the output pressure chamber 15 through the inlet-valve-seat member 16 which is stationarily mounted or cast in situ in the body 8 (FIGURES 3, 5 and 8). The inlet-valve-seat member 16 is provided with an aperture extending therethrough, the periphery 43 of whose lower end serves as a stationary valve-seat (FIGURE 5). A flexible output-pressure-diaphragm 17 is mounted within the relay body 8 to form a closure-wall of the output pressure chamber 15; being mounted therein and held in pneumatically-sealed relation to the body 8 by a clamping ring 18 secured to the body by screws 19 spaced at intervals around the ring 18.

The diaphragm 17 has a central aperture in which the movable vent-valve body 20 is mounted and secured in pneumatically sealed relation thereto by a clamping ring or nut 21 threaded on the lower externally threaded tublar portion of the movable vent-valve body 20 (FIGURE 5).

The movable vent-valve body 20 includes an axial aperture 22, the lower periphery 34 of which serves as a valve-seat. The upper end of the axial passage 22 in the movable vent-valve-housing 20 communicates with one or more lateral vent-openings 23 which discharge on the vent-side of the diaphragm 17, namely, in the vent-space 24 between the diaphragm 17 and the nozzle-pressure-diaphragm 25; the space 24 being, in turn, vented to the atmosphere through one or more vent-openings 26 (FIGURES 5 and 8).

Figure 15:
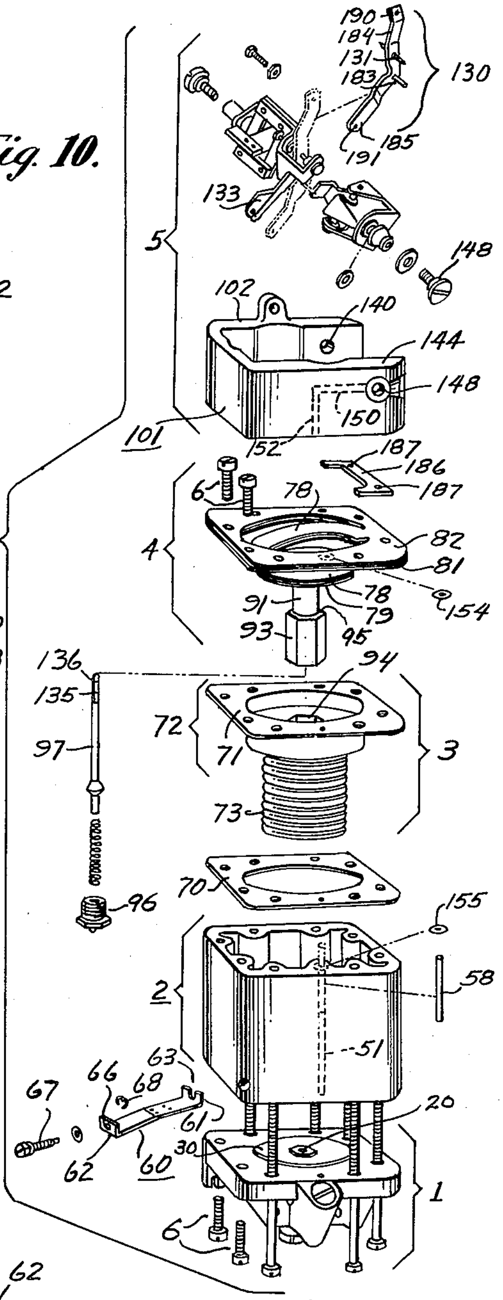
FIGURE 15 represents an exploded perspective view of the transmitter shown in FIGURES 1 to 14 and 16 to 24.
Figure 13:
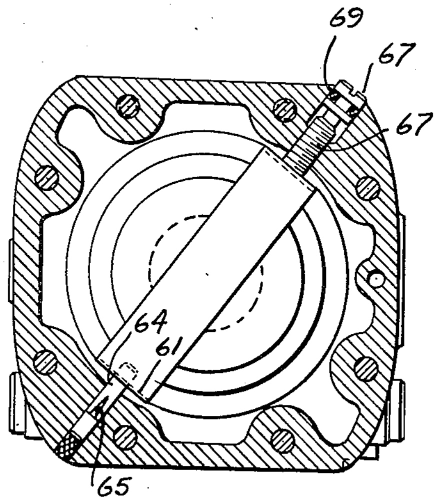
FIGURE 13 represents a cross-sectional view on line 13—13 of FIGURE 3.
Figure 14:
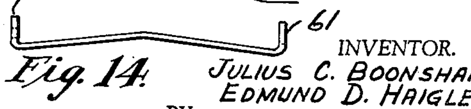
FIGURE 14 represents a side-elevational view of the zero-suspension spring which is shown in FIGURE 13.

The outer periphery of the nozzle-pressure-diaphragm 25 is clamped between and pneumatically sealed in relation to the relay body 8 and the bellows-housing 2 (FIGURES 3, 8 and 15).

Figure 24:
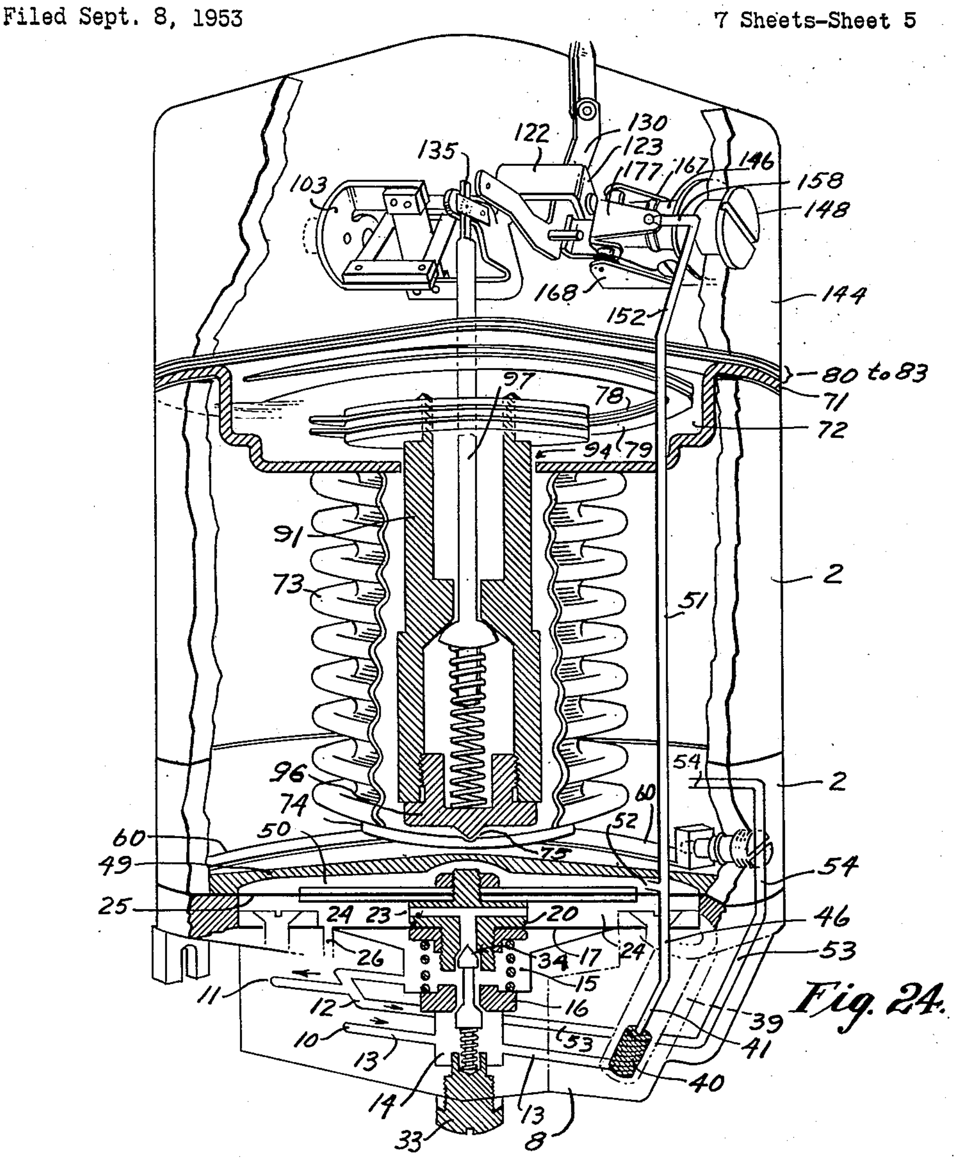
FIGURE 24 represents a perspective view (partly broken away) of the transmitter embodying the present invention, shown, in part, schematically.
Figure 26:
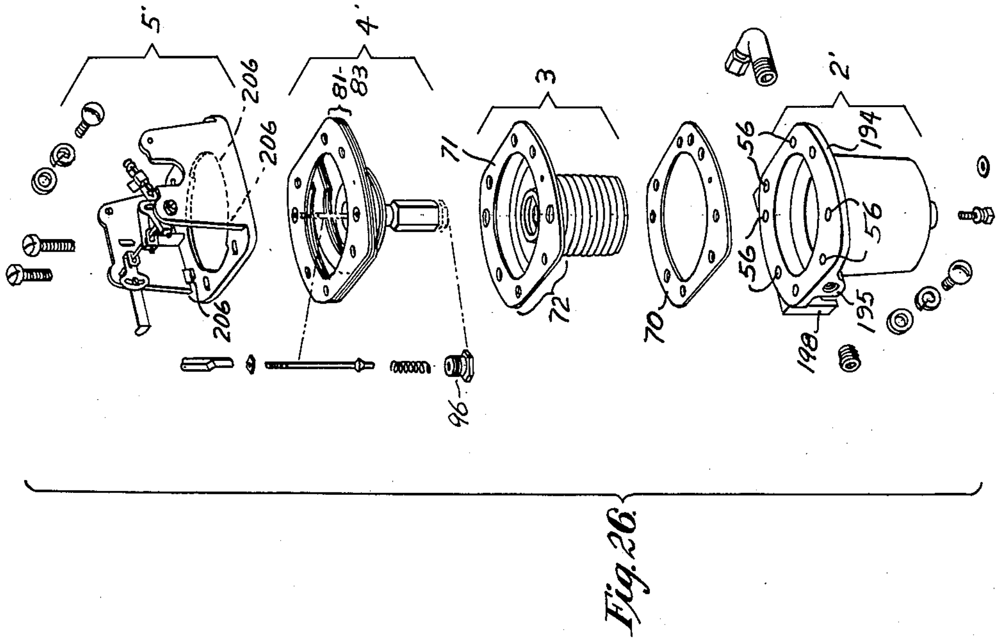
FIGURE 26 represents an exploded perspective view of the same.
Figure 25:
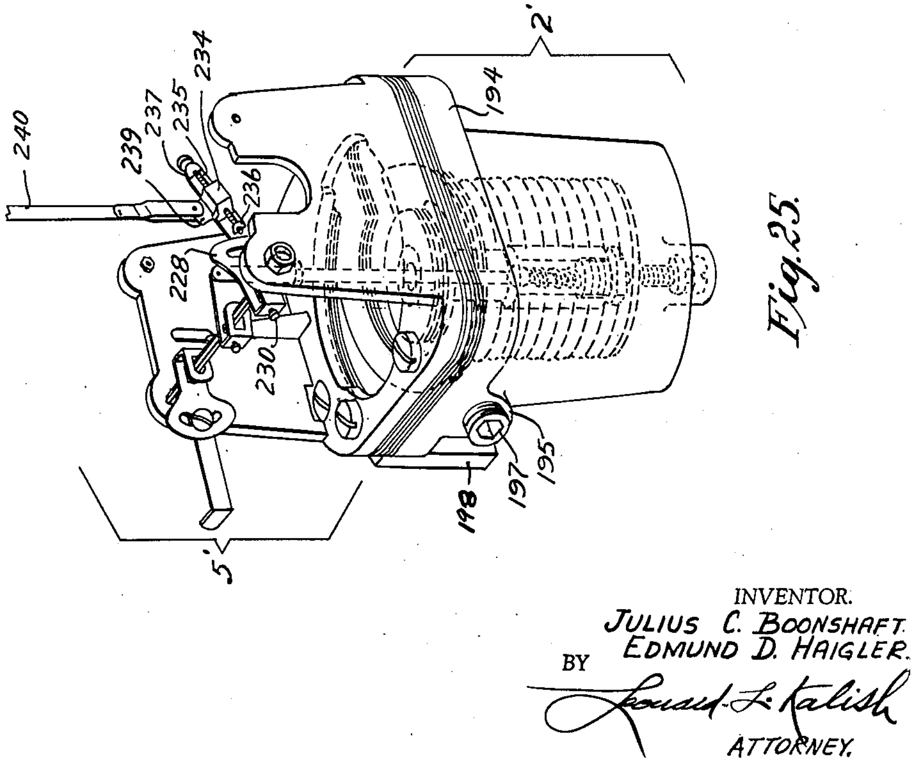
FIGURE 25 represents a perspective view of pneumatic receiver embodying the present invention.

The diaphragm 25 may be flanked by a pair of metallic stiffening discs 27; provided with registering central apertures through which a screw-extension 30 of the movable valve housing 20 extends, having a nut thereon firmly securing and sealing the movable valve-body 20 to the diaphragm 25 (FIGURES 5, 3 and 24). The spring 31 urges the valve-body 20 and diaphragms 17 and 25 upwardly.

The movable vent-valve body 20 being connected to both the output-pressure-diaphragm 17 and to the nozzle-pressure-diaphragm 25, will at all times assume a position which is the resultant of the forces of the respective air pressures on the exposed areas of the two diaphragms and of the forces of the springs 27 and 35. The nozzle-pressure diaphragm 25 is of substantially larger diameter than the output-pressure diaphragm 17; the effective diameters being the outermost diameters of the free or movable portions of the diaphragms. These effective diameters of the diaphragms are such that the affected area of the nozzle-pressure diaphragm 25 will be approximately four times the affected area of the output-pressure diaphragm 17. The ratio four to one may of course be changed, although in the specific embodiment shown this ratio has been selected as one which has been found satisfactory and desirable for practical operating conditions.

A screw-threaded opening 32 is provided in the relay body 8, opening into the supply-passage 13, and into this opening 32 a valve-stem-guiding screw-plug 33 is screw-threadedly secured (with a suitable gasket beneath the head thereof for pneumatically sealing the plug in the opening). The plug 33 is provided with an inner cup-like terminal portion in which the lower end of a helical compression spring 35 is nested. The facing end of the movable vent-valve body 20 is provided with an inverted cup-like recess just beneath the movable vent-valve-seat 34 thereof, which recess serves to guide the vent-valve-head 36. The valve-stem 37 extends through the helical compression spring 35, partly into the guiding cup in the plug 33, and extends through the central passageway in the inlet-valve-seat member 16 and carries the vent-valved-head 36 at its upper end, and carries the inlet-valve-head 38 intermediate its ends. The two valve heads 36 and 38 and the lower end of the valve stem 37 are so spaced in relation to each other that when the movable vent-valve body 20 is deflected downwardly by the resultant of the opposed air and spring forces, the vent-valve-head 36 is seated upon its valve-seat 34 at the lower end of the aperture 22 and closes it, while the inlet-valve-head 38 is unseated from its valve-seat 43 in the stationary valve-member 16, and so that when the vent-valve body 20 is deflected upwardly by the resultant of the air and spring forces, the inlet valve 38 first shuts off the inlet-air, and then the vent-valve 36 unseats; the lower end of the valve-stem 37 being nested and guided within the helical compression spring 35 and having its lower end spaced sufficiently off the bottom of the guiding cup in the plug 33 to permit a sufficient unseating movement of the valve 38.

The supply passage 13 communicates with restrictor-passageway or chamber 39, in which an air-filter 40 and a capillary restrictor tube 41 are mounted and so arranged that the flow of air from the supply passage 13 is restricted to flowing through the capillary tube 41; the filter 40 and capillary-tube 41 being parts of a removable screw-plug 42 mounted and sealed within the chamber 39. The capillary tube portion 41 is sealed to the wall of the chamber 39 and discharges into the nozzle-supply passageway 46 in the relay-body 8.

The bellows-housing 2 includes a transverse partition wall 49 which serves as the wall of the nozzle-pressure chamber 50 above the nozzle-pressure diaphragm 25. A nozzle-supply passageway 51 is formed through the body of the bellows-housing 2, in alignment and registration with the nozzle-supply passageway 46 in the relay body 8 and communicating therewith. A nozzle-pressure passageway 52 extends from the passageway 51 into the nozzle-pressure chamber 50 above the diaphragm 25, so as to impress the nozzle-pressure at all times upon the upper side of the diaphragm 25.

Figure 9:
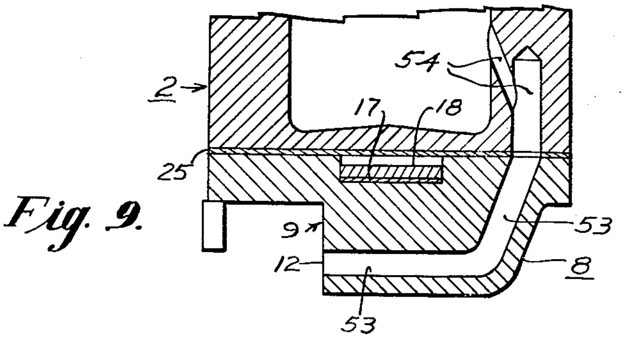
FIGURE 9 represents a fragmentary cross-sectional view on line 9—9 of FIGURES 2 and 8.

The feed-back port 12 is the outer terminus of the feed-back passage 53, which first extends through the relay body 8 horizontally and then upwardly, and communicates with a registering passageway 54 in the bellows-housing 2, which communicates with the interior of the bellows-housing 2, so as to constitute the output pressure (of the relay) the feed-back pressure within the interior of the bellows-housing 2, as indicated in FIGURE 9.

The feed-back passage 53 may in turn be connected to the output-pressure side of the diaphragm 17, by interconnecting the output-port 11 with a feed-back port 12 by any suitable interconnector secured to the port-face 9 of the relay-housing 8 or by any suitable internal passageway (within the relay-housing 8) between the passageway 53 and the output chamber 15 (as indicated in FIGURE 24).

The vertical walls of the bellows-housing 2 are thickened sufficiently to accommodate the six through-holes 55 and two tapped blind screw-holes 56 and 57 extending from its top and from its bottom, respectively.

The lower end of the vertical nozzle-air passageway 51 extending through the vertical wall of the bellows-housing 2 is in registration with the nozzle-supply passageway 46 in relay-body 8, and has a connecting-tube 58 sealed in its upper end (by an O-ring). The connecting tube 58 extends through the superimposed bellows-supporting flange (71) of the bellows-assembly 3 and through the sealing-gasket 70 therebeneath and through the spring-flanges (80 and 81) and spacers (82 and 83) of the spring-assembly 4, into the nozzle-supply passageway (152) of the frame member 101 of the input and pilot section 5, to which passageway it is sealed by an O-ring or the like (as indicated in FIGURES 3 and 15).

An adjustably bowed bellows-stop leaf-spring 60 is disposed within the bellows-housing 1, adjacent the bottom thereof, having up-turned parallel ears 61 and 62 at its ends. The ear 61 has an open slot 63 which hooks over (or into an annular groove in) the anchor-pin 64 set in the externally plugged hole 65. The ear 62 has hole 66 therein which fits the reduced-diametered end of adjustment-screw 67 and is held thereon by the snap-ring 68. Screw 67 is mounted in the walls of the bellows-housing 2 diagonally opposite the anchor-pin 64 and is sealed therin pneumatically by O-ring 69. When screw 67 is turned to the right (or so as to move towards the interior of the bellows-housing 2) it forces the end 62 of spring 60 inward and thereby further bows the spring upwardly in the middle so as to raise its bellows-stop position which limits the downward travel of the bellows under the influence of the flexure-spring (80 and 81).

Bellows-assembly 3 (FIGURE 15) is mounted on top of the bellows-housing 2, with an intermediate sealing gasket 70 between the flange 71 of the bellows-mounting cup 72 and the top of the bellows-housing 2. The bellows-assembly 3 includes a flanged, ribbed-bottom cup 72, having the mounting flange 71, which is perforated for screws 6 and 7 and for nozzle-air-tube 58. To the bottom of the cup 72 a multi-convolution metal bellows 73 is cemented or soldered. The lower end of bellows 73 is cemented or soldered to the bellows-closure or "head" 74, having a conical pivot-depression 75 in the center thereof.

The upwardly extending concentric annular rib 76, in the bellows-mounting cup 72, forms a corresponding narrow downwardly-facing annular groove in which the up-turned annular edge portion of the upper end of the bellows 73 may nest, as indicated in FIGURE 3. The bottom of the cup 72 is also provided with a concentric annular off-set 77, which serves to center the up-turned annular terminal portion of a bellows of larger diameter; if a larger diameter bellows, indicated by the vertical dotted lines 73–*a*, is desired. By these means (76 and 77) bellows of different diameters may be mounted to the same bellows-mounting cup 72; such differently diametered bellows serving to provide different operating ranges. Thus, for instance, a bellows having an outside diameter of approximately 1 and ⅞" may be provided for operating ranges between 0–4 to 0–9 pounds per square inch of output-pressure, and a bellows having an outer diameter of approximately 1 and ½" may be provided for operating ranges between 0–10 and 0–24 pounds per square inch of output-pressure, and a bellows having an outside diameter of approximately 11/16' may be used for operating ranges between 0–25 and 0–80 pounds per square inch of output-pressure. The largest diametered bellows (indicated by dotted lines 73–*a*) would be centered on the vertical annular off-set portion 77 of the cup 72. The intermediate diametered bellows (shown in FIGURE 3) has an upturned portion of its inner diameter nesting in the annular groove within the rib 76. The smallest diametered bellows would have an up-turned portion of its outer diameter nesting in the annular groove in the rib 76.

The lower or bottom bellows-closure or "head" 74 may be provided with a similar plurality of bellows-centering grooves or off-sets, or the head 74 may be individually sized to fit the ends of the differently-diametered bellows.

Figure 10:
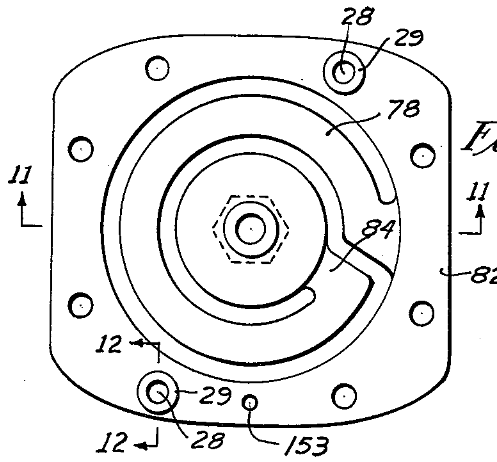
FIGURE 10 represents a top plan view on line 10—10 of FIGURE 3, showing the flat helical spring and the sealing gasket over its outer circular anchorage portion.
Figure 12:
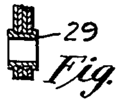
FIGURE 12 represents a cross-sectional view on line 12—12 of FIGURE 10.
Figure 11:
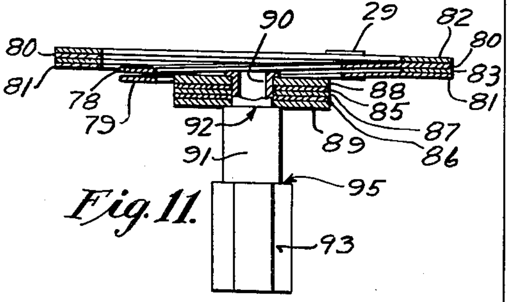
FIGURE 11 represents a side-elevational view of the spring-stem, and a cross-sectional view of the spring-assembly, on line 11—11 of FIGURE 10.

The spring-assembly 4, shown in FIGURES 3, 10, 11, 12, 15, 24, 25, 26 and 28, includes a pair of spaced-apart flanged spiral cantilever springs 78 and 79, having similar generally annular supporting-flanges or mounting-flanges 80 and 81, respectively, an upper generally annular flat spacer 82 adjacent the upper surface of the flange 80 of the upper spring 78 and a similar spacer 83 between the flange 80 of the upper spring 78 and the flange 81 of the lower spring 79. The inner ends 84 of the springs 78 and 79 have formed thereon (and integrally therewith) generally flat washer-like terminal portions 85 and 86, respectively. A spacer-washer 87, of the same thickness as the spacer 83 or even having a considerably greater axial dimension, is interposed between the washer-like spring-terminals 85 and 86. Relatively thick flanking washers 88 and 89 are disposed above the spring-terminal 85 and below the spring-terminal 86, respectively. The reduced-diameter upper end-portion 90 of the tubular bellows-engaging stem or plunger 91 is extended through the registering holes in the spring-terminals 85 and 86 and in the spacer 87 and flanking washers 88 and 86, and is then flared over or riveted over the upper washer 88, as indicated in FIGURES 3 and 11 so as firmly to clamp said washer-like spring-terminals and the spacer therebetween and the flanking washers, in a generally rigid stack, against the shoulder 92 of the bellows-engaging stem or plunger 91.

The spiral cantilever spring is particularly suitable for a transmitter or receiver because it can be simply and firmly clamped at its ends, because it is more compact for any given length of cantilever and provides the required operating range at lower stress, and because it aids the temperature-compensation both since it can be made from sheet stock and since its over-all compactness reduces the size of the supporting structure and so reduces the linear expansions and contraction due to changes in temperature.

If the springs 78 and 79 are left flat, as punched, their characteristic, namely, deflection plotted against force applied, ranges from a straight-line over short strokes, to a bow, over medium strokes. If the springs 78 and 79 are preformed (in heat-treatment or otherwise) to a shallow cone, as shown in FIGURE 11, the travel for an essentially straightline characteristic is longer than before, and with increasing strokes the characteristic curve assumes a shallow S shape. Thus a choice of characteristics is available from one basic spring.

A wide variety of pressure-ranges may be provided by using one to four springs in the spring-assembly 4 with bellows of different diameters as previously described.

The supporting flanges of each two springs in a multiple spring stack are spaced by similar spacers 83 and their washer-like terminals are spaced by similar washers 87.

An over-range stop may be provided by the lower hexagonal end portion 93 of the stem 91 which just passes through a hexagonal hole 94 in the bottom of the bellows-mounting cup 72. In the assembled position, hexagonal portion 93 of the stem 91 is rotated 30° from the position in which it passed through the hexagonal hole 94 in cup 72, so that its shoulders 95 at the corners of the hexagon 93 provide an over-range stop against the bottom surface of the cup 72 adjacent the hole 94 therein. The shoulders 95 are so located along the stem 91 that the upward travel of the stem 91 will be stopped at the desired limit.

A cap 96 is screw-threadedly secured in the lower end of the tubular stem 91, and has a rounded or conical point or projection nested in the conical despression or cavity 75 in the bellows-closure or "head" 74.

Figures 27, 28, 29, 30, 31, 32:
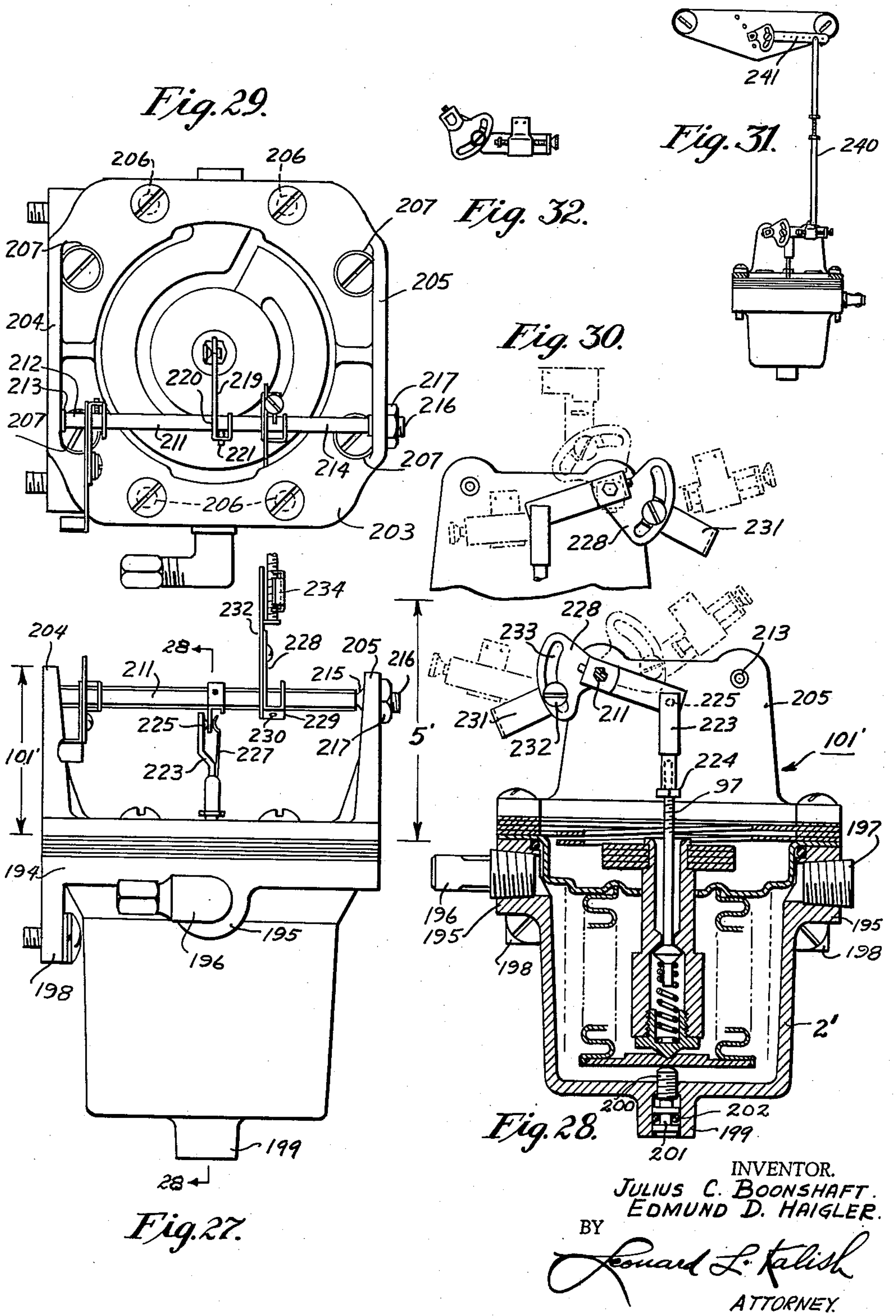
FIGURE 27 represents a side elevational view of the same.
FIGURE 28 represents a cross-sectional view on line 28—28 of FIGURE 27.
FIGURE 29 represents a top plan view of said pneumatic receiver.
FIGURE 30 represents a view of the upper housing member of the receiver shown in FIGURE 28, with the pivot and the arms carried thereby disposed in the alternate position, opposite to that shown in FIGURES 28 and 29.
FIGURE 31 represents a typical installation of the pneumatic receiver, as applied to operate a pen-arm-carrying spindle of a recorder.
FIGURE 32 represents a side elevational view of the transmitting arm carried by the spindle of the pneumatic transmitter.

A connecting-rod 97, having a ball-shaped or otherwise shaped enlargement or abutment 98 thereon, is disposed within the tubular bellows-engaging thrust-stem 91, in the manner indicated in FIGURES 3, 24 and 28, with the abutment 98 thereof held in contact with the cone-shaped internal shoulder 99 within the thrust-stem 91 by a light safety-spring 100. In case the upward motion of the rod 97 is stopped or meets resistance of an order corresponding to the strength of the safety-spring 100, the bellows 73 may continue to contract without damaging the input mechanism within the input-section 5 (to which the stem 97 is connected), because continued upward travel of the bottom of the bellows-head 74 and of the tubular bellows-engaging stem 91 will then merely compress the light safety-spring 100 without moving the stem 97 upwardly any further.

Figure 4:
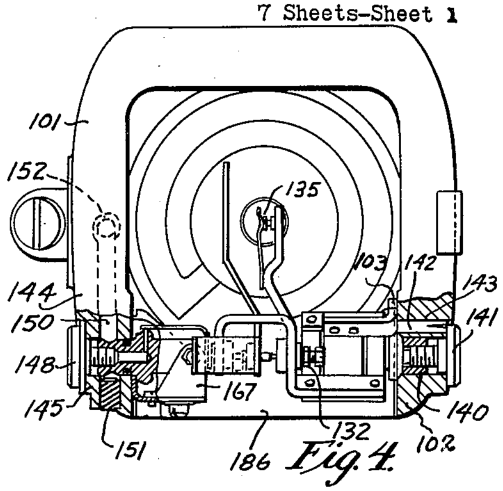
FIGURE 4 represents a top-plan view of the transmitter, with a portion thereof in section, taken generally on line 4—4 of FIGURE 2.

The input section 5 of the transmitter (shown in FIGURES 1 to 24, inclusive) includes a frame member 101 which is generally U-shaped in plan view, as indicated in FIGURE 4.

Figure 17:
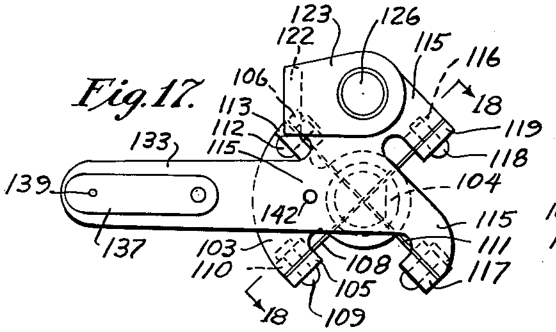
FIGURE 17 represents a side-elevational view of the same.
Figure 18:
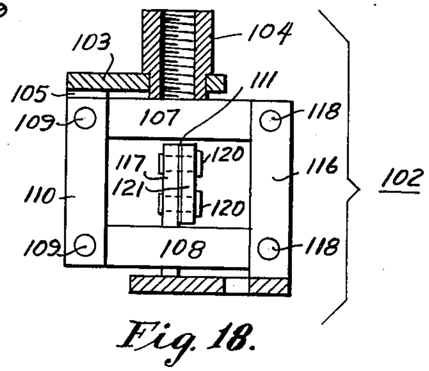
FIGURE 18 represents a cross-sectional view on line 18—18 of FIGURE 17.
Figure 16:
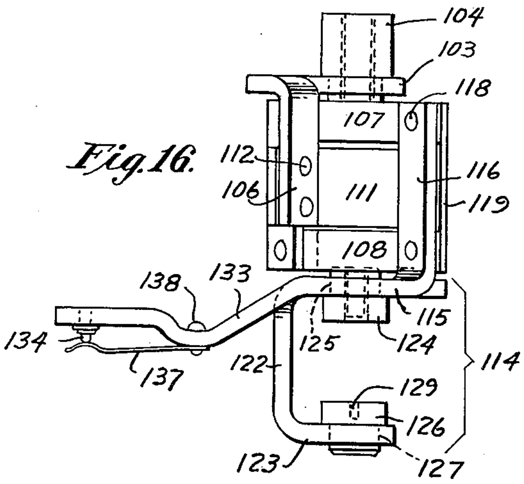
FIGURE 16 represents a top-plan view, on an enlarged scale, of the flapper-operating cross-spring pivot-arm.

The flexure-pivot and bellows-lever unit shown in FIGURES 16 to 18 (and also in FIGURES 3, 4, 15 and 24) is mounted on the leg 102 of the U-shaped frame member 101, in the manner indicated particularly in FIGURE 4, and includes a stationary spring-mounting plate 103 fixedly secured upon a mounting-bushing 104 (in any suitable manner), as indicated in FIGURE 18. The stationary spring-mounting plate 103 has two flat spring-carrying arms 105 and 106 extending therefrom, at a right angle thereto; the two arms 105 and 106 being 90° apart in relation to the axis of the mounting-bushing 104. A pair of thin flat flexure-springs 107 and 108 are secured to the lower arm 105 by rivets 109; preferably with a firm cap-plate 110 superimposed on the ends of the springs 107 and 108 beneath the beads of the rivets 109.

A single flexure-spring 111, having a width equal to the combined widths of the springs 107 and 108, is similarly secured to the upper arm 106 by rivets 112, with a cap-plate 113 superimposed on the end of the spring; the flexure-spring 111 passing between flexure-springs 107 and 108 and generally at a right angle thereto, as indicated in FIGURES 16, 17 and 18. To the opposite ends of the flexure-springs 107 and 108 and 111, a bracket or support 114 is secured, including a plate 115 (parallel to the plate 103) having upper and lower spring-mounted arms 116 and 117 extending therefrom at a right angle thereto, and spaced 90° apart in relation to the axis of the mounting-bushing 104. The ends of the springs 107 and 108 are secured to the arm 116 by rivets 118, preferably with a cap-plate or clamping plate 119 superimposed on the ends of the springs 107 and 108 and clamped thereagainst by the rivets. The end of the spring 111 is secured to the arm 117 by rivets 120, again preferably with a cap plate 121 superimposed on the end of the spring and riveted thereto by the rivets 120, as indicated particularly in FIGURES 17 and 18. In order to make the so formed flexure-pivot free of any unwanted distortion, the two flexure-springs 107 and 108 may be made integrally with each other by forming them out of a single piece of the sheet spring steel as, for instance, by merely removing from the center of a wide strip of such sheet steel, the portion which intervenes between the springs 107 and 108 and the arms 105 and 116, so as to form a rectangular frame of which the springs 107 and 108 are two sides, and the other two sides of which are riveted to the arms 105 and 116, in the manner indicated above.

A pivot-arm 122 extends from the plate 115 at a right angle thereto (as indicated particularly in FIGURE 16), having a terminal portion 123 thereof at a right angle thereto and parallel to the plate 115.

An internally threaded tubular bushing 124 is press-fitted or otherwise secured within an opening 125 in the plate 115 of the bracket 114. A pivot-bearing member 126 is similarly press-fitted or otherwise secured in a hole 127 in the arm 123, in axial alignment with the bushing 124.

The holes 125 and 127 and the bushing 124 and pivot-bearing member 126 have a common axis which is parallel to but off-set upwardly with respect to the axis of the mounting-bushing 104, in the manner indicated in FIGURE 17.

A pivot-screw 128, having a conical or similar pivot-bearing recess in its free end, is threadedly mounted in the bushing 124, in the manner indicated in FIGURES 3 and 4. The pivot-bearing member 126 also has a similar pivot-bearing recess 129, as indicated in FIGURE 16.

An input-lever 130, having a pivot-pin 131 extending therethrough and secured thereto, is pivotally mounted between the bushing 124 and the pivot-bearing member 126, with one of the tapered or conical ends of the pivot-pin 131 nesting and journalled in the pivot-bearing recess in the end of the pivot-screw 128 and with the other of the tapered or conical ends of the pivot-pin 131 nested and journalled in the pivot bearing recess 129 in the bearing member 126. The pivot-bearing-screw 128 is adjusted so as to eliminate any axial slack between the bearing-ends of the pivot-pin 131 and the corresponding bearing-recesses in which they are journalled, without however exerting any such axial pressure as would impose any significant frictional resistance to the pivotal movement of the input-lever 130. A lock-nut 132 may be provided on the pivot-screw 128, to lock it in position after it has been adjusted for the proper journalling of the ends of the pivot-pin 131.

A bellow-arms 133 extends from the plate 115 of the bracket 114 and has a pivot-pin 134 mounted on the free end thereof, as indicated particularly in FIGURE 16, to which pivot-pin 134 the upper flattened end 135 of the connecting-rod 97 may be pivotally connected in the manner indicated in FIGURES 3, 4 and 24; the upper flattened end 135 of the rod 97 having a pivot-hole 136 therethrough, which is adapted to be hooked onto pivot-pin 134. A leaf-spring 137, secured to the arm 133 by rivet 138 (or by any other suitable means), extends over the end of the pivot-pin 134 and is provided with a small opening 139 in alignment with the pivot-pin 134, in which the free end of the pivot-pin may nest, thereby to retain the upper flattened end 135 of the connecting-rod 97 on the pivot-pin 134.

The arm 133 is generally horizontal, and the line passing through the pivot-pin 134 thereof and the pivotal center of the flexure-springs (107 and 108 and 111), namely, where the flexure-springs cross each other (as indicated in FIGURE 17), is at a right angle to the plane common to the axis of the flexure-pivot and to the axis of the pivot-pin 131.

The unit shown in FIGURES 16, 17 and 18 is mounted on the leg 102 of the frame member 101, in the manner indicated particularly in FIGURE 4. The mounting-bushing 104 extends into a mounting-opening 140 and is secured therein by the screw 141 which is threaded into the bushing 104. In order further to insure against any rotation of the bushing 104 within the opening 140, the mounting plate 103 may also be provided with a dowel-pin 142 parallel to the bushing 104 and extending into a corresponding opening 143 in the leg 102 of the frame member 101.

Figure 20:
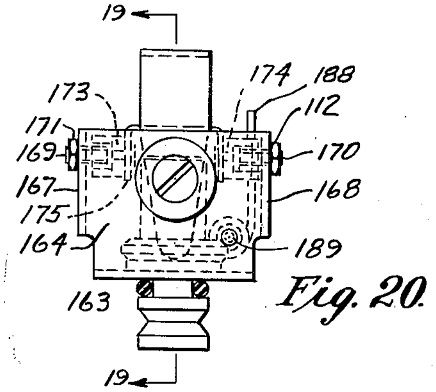
FIGURE 20 represents a front-elevational view of the same.
Figure 21:
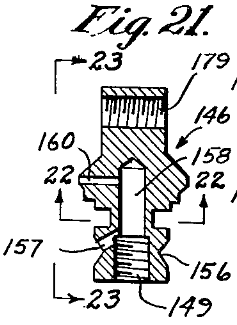
FIGURE 21 represents a cross-sectional view of the nozzle, on line 21—21 of FIGURE 23.
Figure 19:
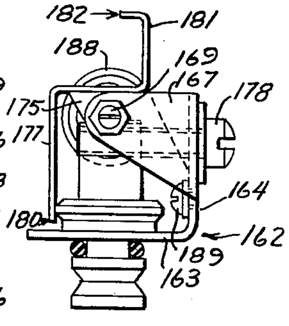
FIGURE 19 represents a top plan view of the nozzle and flapper (or "pilot" assembly).
Figure 23:
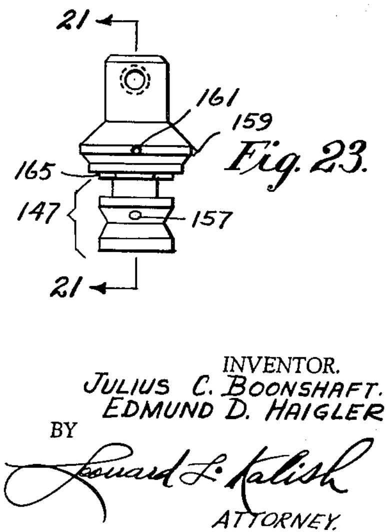
FIGURE 23 represents a side elevational view of the nozzle, shown in FIGURES 19, 20 and 21, viewed on line 23—23 of FIGURE 21.

On the opposite leg 144 of the frame member 101, the nozzle-and-flapper assembly shown particularly in FIGURES 19 and 20 (and also shown in FIGURES 3, 4, 15 and 24) is mounted to a mounting-hole 145 which is preferably co-axial with the mounting-hole 140 in the other leg (102) of the frame member 101.

The nozzle-and-flapper assembly includes the nozzle member 146 (FIGURES 21, 22 and 23) whose base portion or mounting-portion 147 is disposed within the mounting-hole 145, in the manner indicated in FIGURE 4, and is secured therein by the screw 148 whose stem is threaded into the internally threaded hole 149 in the mounting-portion 147 of the nozzle member 146.

A generally horizontal nozzle-air passageway 150 is provided in the leg 144 of the frame member 101, intersecting the mounting-hole 145, in the manner indicated in FIGURE 4. Any suitable plug 151 may be provided for closing the outer end of the nozzle-supply passageway 150. The inner end of the nozzle-supply passageway 150 intersects and communicates with a vertical nozzle-supply passageway 152 in the leg 144 of the frame member 101. The lower end of the passageway 152 is in registration with the vertical nozzle-supply passageway 51 through the bellows-housing 2, as indicated in FIGURE 3. The connecter-tube 58 (referred to hereinabove) extends through the aligned holes 153 in the spring-flanges 80 and 81 and spacers 82 and 83 and into the passageway 152, and is sealed thereto by an O-ring 154 within a ring-receiving recess in the frame member 101, surrounding the tube 58; the tube 58 being similarly sealed to the bellows-housing 2 by the O-ring 155.

An annular groove 156 in the mounting-portion 147 of the nozzle member 146 is in alignment with the passageway 150. A hole 157 extends from the groove 156 to the central hole 158 within the nozzle member 146. The nozzle member 146 is provided with a narrow cylindrical portion 159 of a diameter greater than the rest of the nozzle member 146, and through this cylindrical portion a small radial hole or passageway 160 is provided, communicating with the axial passageway 158. The outer end of this radial passageway 160 constitutes the nozzle 161.

Figure 22:
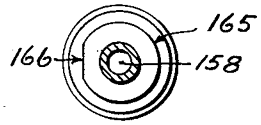
FIGURE 22 represents a cross-sectional view on line 22—22 of FIGURE 21.

A flapper-mounting bracket 162 having a nozzle-mounted arm 163 and a flapper-carrying arm 164, is mounted upon the nozzle member 146, in the manner indicated in FIGURES 19 to 23 and in FIGURE 4. Immediately adjacent the mounting-portion 147, a narrow, cylindrical bracket-mounting portion 165 is provided on the nozzle-member 146, said bracket-mounting portion being provided with a slight "flat" 166 (FIGURE 22). The nozzle-mounted arm 163 of the bracket 162 is provided with an opening therethrough corresponding to and snugly fitting over the bracket-mounting portion 165, including also a "flat" corresponding to the "flat" 166, so that when the arm 163 is placed on the bracket-mounting portion 165, it cannot turn in respect to the nozzle member 146. Hence, when the nozzle member 146, with the bracket 162 mounted thereon in the manner indicated in FIGURES 19 and 20, is secured to the leg 144 of the frame member 101, in the manner indicated in FIGURE 4, the arm 165 of the bracket 162 is firmly clamped against the inner face of said leg 144 of the frame member 101.

Parallel upper and lower pivot-carrying plate 167 and 168 are extended from the upper and lower edges (respectively) of the arm 164 of the bracket 162, as indicated in FIGURES 19, 20, 4 and 24. Each of the plates 167 and 168 has a threaded hole therethrough or threaded bushing therein in axial alignment with each other and with their common axis parallel with arm 163 as well as with arm 164 of the bracket 162, in which threaded holes or bushings pivot-screws 169 and 170 are threadedly mounted and locked in place by lock-nuts 171 and 172; the inner ends of pivot-screws 169 and 170 having pointed pivot-ends which extend into corresponding conical bearing recesses in bearing members 173 and 174 carried by the opposite pivot-arms 175 and 176 of the flapper 177, thereby pivotally mounting the flapper 177 between the plates 167 and 168, with its pivotal axis disposed vertically and in the vertical plane in which the axis of the nozzle-mounting hole 145 lies.

The stem of the flapper-adjusting screw 178 is extended through a suitable hole in the arm 164 of the bracket 162, in alignment with the threaded hole 179 in the nozzle-member 146 and is threaded thereinto. The arm 164 is initially so spaced in relation to the axis of the nozzle member 146 that the axis of the pivot-screws 169 and 170 will be slightly to the right of the axis of the nozzle member 146 (as viewed in FIGURE 19), so that by turning the screw 178 further into the threaded hole 179, the arm 164 of the bracket 162 will be flexed slightly so as to bring the axis of the pivot-screws 169 and 170 in proper position so that the nozzle-controlling end 180 of the flapper 177 will bear properly against the nozzle 161. The flapper 177 is provided with an L-shaped arm 181 against whose vertical free edge 182 the flapper-controlling pin 183 of the input-lever 130 is adapted to bear, in the manner indicated particularly in FIGURE 24.

The input-lever 130 may be generally L-shaped, with an upwardly extending arm 184 and horizontal arm 185, so that the input-motion can be applied thereto either horizontally by pivotal connection to the vertical arm 184 thereof, or applied thereto vertically by pivotal connection to the horizontal arm 185 thereof.

The frame member 101 is secured by means of screw 7 on top of the spacer 82 of the spring-assembly shown in FIGURES 10 and 11, in the manner indicated in FIGURES 3 and 15. In order also firmly to secure the portions of the spring-flanges 80 and 81 and spacers 82 and 83 which are not covered by the generally U-shaped frame-member 101, a clamping plate 186 is superimposed upon the spacer 82 between the legs 102 and 144 of the frame-member 101 and is clamped thereon by long screws 7 extending upwardly and having their upper ends threaded into threaded holes 187 in the clamping-plate 186.

A spiral hair-spring 188, having its inner end secured to the bearing-bushing 174 and its outer end secured beneath the head of the screw 189, biases the flapper 177 in the direction of the nozzle 161 and biases the free edge 182 of the arm 181 in the direction of the flapper-controlling pin 183 on the input-lever 130.

To maintain the spring-flanges 80 and 81 and spacers 82 and 83 in assembled relation, assembly-holes 28 may be provided therethrough (FIGURES 10 and 12), through which tubular rivets 29 extends, with their ends flared or riveted over. The holes 28 in the outermost members 81 and 82 may be countersunk to receive the flared-over ends of the rivets 29. Alternatively, the juxtaposed surfaces of the frame-member 101 and of the flange 71 of the bellow-mounting cap 72 may be recessed to receive the flared ends of the rivets 29.

Clockwise rotation of the input lever 130 (as viewed in FIGURE 2) by link-connection pivoted in holes 190 or 191, is upscale or increases output-pressure. If the measurement decreases, while the system is in equilibrium, lever 130 rotates about the axis of its pivot so as to move the flapper-controlling pin 183 to the right (FIGURE 2), thereby lifting the flapper-end 180 from nozzle-opening 161 and so venting air from the nozzle 161 and operating the relay-section 1 to reduce the output-pressure thereof and to exhaust air from bellows-housing 2 and from the transmission line connected to output-port 11 and extending to a point of reading, as, for instance, a receiver shown in FIGURES 25 to 32. As a consequence of reduced pressure in the bellows-housing 2, the bellows-assembly 3 develops less upward force against spring-assembly 4, and is moved downward by the spring-assembly 4 until a new equilibrium point is reached. This, in turn (through connecting-rod 97), moves arm 133 downwardly, thereby rotating the plate 115 counterclockwise (in FIGURE 17) about the flexure-pivot-axis. As a result, the axis of pivotation of the pivot 131 of the input-lever 130 is moved to the left, and hence the flapper-controlling pin 183 on the input-lever 130 is also moved to the left, until flapper-end 180 is on the point of closing the nozzle 161 again, and a new equilibrium is reached. The reverse actions occur on an upscale change of measurement.

If it is desired that the counterclockwise rotation of the input-lever 130 (FIGURE 2) should have an upscale or output-pressure-increasing effect, the nozzle and flapper assembly shown in FIGURES 19 and 20 is turned 180° (about the axis of the mouting hole 145), thereby placing the flapper-controlling pin 183 on the right of the flapper 177 and to the left of free edge 182 of the arm 183 thereof, and so causing opposite motion relationships.

There is no adjustment or proportioning band on this transmitter (as on a pneumatic controller), and none is needed. A major change in the range of the output pressure is affected by a different bellows-assembly 3 and/or spring-assembly 4, as indicated hereinabove. A radius adjustment may be provided on the input lever 130 to allow minor adjustment of the transmitter to exactly the specified range of output-pressure (as, for instance, 3–15 p.s.i.) for standard full-scale travel of the indicating or recording instrument, in spite of manufacturing tolerance variations in the transmitter. However, as such adjustment is usually provided on the pen-movement, it need not be provided in the transmitter.

The pneumatic receiver of the present invention, which is preferably used with the above-described transmitter, is shown in FIGURES 25 to 32. The receiver has the same bellows-assembly 3 and the flexure-spring-assembly 4 as the transmitter, with modified and simplified bellows-housing 2′ in the form of a simple flanged cup whose interior air-space is equivalent to that of the bellows-housing 2 of the transmitter, though the housing 2′ is smaller in external dimensions than the housing 2, by reason of the reduction in the thickness of its walls. Eight tapped screwholes 56 (for short screws 6) extend through the flange 194 of the bellows-housing 2′. Two opposite pipe-tapped bosses 195 are provided on the bellows-housing 2′, one for connection to the pressure to be measured, through fitting 196, and one having the plug 197 therein. Two slotted mounting ears 198 also extend from flange 194, at the rear. At the bottom of the bellows-housing 2′ a boss 199 is provided, in which is mounted the adjustable stop-screw 200, whose head 201 is sealed by the O-ring 202. This permits an adjustment of the transmission without interfering with the relay-section of a transmitter.

The mechanical output section 5′ of the transmitter includes a generally U-shaped frame-member 101′, having a flange-like base portion 203 and a rear leg 204 and a front leg 205.

Four holes 206 are provided in the base 203 of the U-shaped frame-member 101′, of a diameter just sufficient to clear the threads of the screws 6, and four holes 207 are provided in the said base, of a size sufficient to clear the heads of the screws 6. The holes 206 and 207 register with the tapped screw-holes 56 in the flange 194 of the belows-housing 2′ and the corresponding thread-clearance holes in the flange 71 of the bellows-mounting cup 72 of the bellows-assembly 3 and in the gasket 70 therebeneath and in the spring-flanges 80 and 81 and spacers 82 and 83 of the spring-assembly 4. The screws 6 in the head-clearance holes 207 have their heads bearing against the stacked spring flanges and spacers (81—83), while the screws in the thread-clearance holes 206 have their heads bear against the flange-like base 203 of the frame-member 101′, so that by removing only the latter screws, the mechanical output section 5′ may be removed from the receiver without disturbing the spring-assembly 4 or without disturbing the bellows-assembly 3 in relation to the bellows-housing 2′. Similarly, if desired, two of the screw-holes in the stacked spring flanges and spacers (81—83) may likewise be enlarged to the head-clearance size, so that the spring-assembly 4 may also be removed without removing bellows-assembly 3 in relation to the bellows-housing 2′.

A spindle 211 is journalled or pivoted between the legs 204 and 205 of the frame-member 101′, either to the right or to the left but parallel with the fore-and-aft vertical center-plane of the receiver. The spindle 211 is preferably formed of a stainless steel rod of hexagonal cross-section, with its rear end 212 having a conical or pointed pivoted portion which is nested in a conical pivot-recess of a bearing-bushing 213 in the rear leg 204 of the frame-member 101′ while the front end 214 of the spindle 211 may have a conical bearing recess therein, into which the conical or pointed end 215 of the pivot-screw 216 extends. The pivot-screw 216 is threadedly mounted in an opening in the front leg 205 of the frame member 101′, and is locked in its adjusted position by a lock-nut 217.

A lever 219, having a U-shaped spindle-mounted end 220, is provided with a hexagonal hole through the two legs of its U-shaped end 220 (as shown in FIGURE 28) through which the spindle 211 extends; the lever being locked to said spindle by a set-screw 221 which is threaded into the base of the U-shaped end 220 and bears against one of the flats of the hexagonal spindle 211.

To the upper end of the connecting rod 97 an adjustable end member 223 is threadedly secured and locked in place by the nut 224. The offset end of the connector-end-member 223 carries a pivot 225 which enters the pivot-hole in the free end of the lever 219, and is held thereon by a leaf spring 227 secured to the connector 223; the free end of the spring bearing against the apertured end of the lever 219, to keep it on the pivot 225.

By adjusting the threaded connection between the separable connector 223 and the connecting-rod 97, the initial and final angles of the lever 219 may be selected, at will, for any given range of transmitted pneumatic pressures or for any given range of travel of the connecting-rod 97.

An adjustable lever-assembly, shown in FIGURES 28, 30 and 32 (and also in FIGURES 27 and 29), is mounted on the spindle 211. The adjustable lever-assembly includes a sector 228 having a generally U-shaped spindle-mounting portion 229 which has a hexagonal hole therethrough, through which the spindle 211 extends and to which it is locked by a set screw 230. An adjustable lever 231 is pivoted on the spindle 211 so as to be freely rotatable in relation thereto, and a screw 232, whose stem extends through the arcuate adjustment-slot 233 of the sector 228 and is threaded ino a registering threaded hole in the lever 231, so that by loosening the screw 232 the angular portion of the lever 231 in relation to the sector 228 may be shifted and adjusted; whereupon the screw 232 is tightened.

To the end of the lever 231, a radially adjustable pivot member 234 may be adjustably secured, upon an adjustment-screw 235 revolvably mounted in the end-flanges 236 and 237 carried by the lever 231, so that by turning the screw 235 the pivot-member 234 may be moved radially inwardly or outwardly in respect to the axis of the spindle 211. To one of the pivot-holes 239 of the pivot-member 234, the connecting-link or connecting-rod 240 is pivotally connected; the link or rod 240 having its other end pivotedly connected to the input-lever or input-arm 241 of any suitable recorder, as, for instance, of the pen type recorder or of an indicator or other instrument.

Having described the invention, the following is hereby claimed:

1. A pneumatic-mechanical converter for converting a pneumatic pressure into mechanical motion, and vice versa, in a predetermined ratio, including a rigid pneumatic-pressure-housing closed at one end and open at its other end, a bellows disposed within said housing, said bellows having one closed end and one open end, the closed end of said bellows being nearer to the closed end of said housing and being movable, and the open end of said bellows being affixed and sealed to the opening in the open end of said pressure-housing, whereby a pneumatic pressure chamber is formed between the outside of said bellows and the inside of said pressure-housing, with the outside of said bellows being sealed from the atmosphere while the inside of said bellows is fully exposed to the atmosphere, a pivotally-mounted arm in operative juxtaposition to the open end of said bellows, a connector operatively interposed between said arm and the closed end of said bellows and extending into said bellows through the open end thereof, whereby the compression of said bellows by the pneumatic pressure within said pneumatic chamber will tend to deflect said arm about its povital axis, and a spiral cantilever spring comprising a generally flat band of metal and having an outer peripheral anchorage portion and an inner movable anchorage, operatively interposed between the open end of said pressure-housing and said connector, with the outer anchorage portion thereof affixed to said open end of the pressure housing and with its inner movable anchorage connected with said connector, said spring being so disposed as to oppose the displacement of the closed end of said bellows under the influence of the pneumatic pressure within said pneumatic pressure chamber.

2. A pneumatic transmitter including a rigid pressure-housing closed at one end, a pneumatic-pressure-responsive displacement-element closing the other end of said housing, said housing and said displacement-element together forming a pneumatic pressure chamber sealed from the atmosphere, one side of said displacement-element forming part of said pneumatic pressure chamber within said housing while the other side of said displacement-element is fully exposed to the atmosphere, a pressure-regulating relay-valve having an intake-port for receiving an air-supply at a generally constant pressure and a supply-air-passageway therein including an air-restrictor and an output-air passageway and port for delivering output-air at a variable pressure determined by bleed-off from the supply-air-passageway beyond said air-restrictor, and containing two diaphragms and two valves operated thereby, a pilot-valve forming a bleed-off and having a bleed-off-controlling flapper, said pilot-valve connected with the air-supply passageway in said relay-valve beyond said air-restrictor therein, for regulating the output-air pressure of said relay-valve, said pneumatic-pressure-chamber being connected with the air-output passageway of said relay-valve, and one of said relay-valve diaphragms being subjected to the supply-air and the other to the output-air, a pivotally mounted arm in operative juxtaposition to said pneumatic-pressure-responsive displacement-element, a connector intermediate said arm and said pneumatic-pressure-responsive displacement-element, a flat and generally spiral cantilever spring having an outer anchorage portion affixed to said pressure-housing and having the central portion thereof connected with said connector and opposing the displacement of said pneumatic-pressure-responsive displacement-element by the pneumatic pressure within said pneumatic-pressure-chamber, said pivoted arm carrying an input-pivot parallel to the axis of pivotation of said arm but spaced therefrom in offset relation thereto, an input-lever pivotally mounted on such offset pivot and having a flapper-operator in operative juxtaposition to the flapper of said pilot-valve.

3. A pneumatic transmitting system for transmitting mechanical motion quantitatively and in a predetermined ratio, said system including a transmitter and a receiver, each including a rigid pneumatic-pressure-housing closed at one end and open at its other end, a bellows disposed within said housing, said bellows having one closed end and one open end, the closed end of said bellows being nearer to the closed end of said housing and being movable, and the open end of said bellows being affixed and sealed to the opening in the open end of said pressure-housing, whereby a pneumatic pressure chamber is formed between the outside of said bellows and the inside of said pressure-housing, with the outside of said bellows being sealed from the atmosphere while the inside of said bellows is fully exposed to the atmosphere, a pivotally-mounted arm in operative juxtaposition to the open end of said bellows, a connector operatively interposed between said arm and the closed end of said bellows and extending into said bellows through the open end thereof, whereby the compression of said bellows by the pneumatic pressure within said pneumatic chamber will tend to deflect said arm about its pivotal axis, and a cantilever spring comprising a generally flat band of metal and having an outer anchorage portion and an inner movable anchorage, operatively interposed between the open end of said pressure-housing and said connector, with the outer anchorage portion thereof affixed to said open end of the pressure housing and with its inner movable anchorage connected with said connector, said spring being so disposed as to oppose the displacement of the closed end of said bellows under the influence of the pneumatic pressure within said pneumatic pressure chamber, the pneumatic pressure chamber of said transmitter being pneumatically connected with the pneumatic pressure chamber of said receiver, said transmitter also including a pressure-regulating relay-valve having an intake-port for receiving an air-supply at a generally constant pressure and a supply-air-passageway therein including an air-restrictor and an output-air passageway and port for delivering output-air at a variable pressure determined by bleed-off from the supply-air-passageway beyond said air-restrictor, and containing two diaphragms and two valves operated thereby, a pilot-valve forming a bleed-off and having a bleed-off-controlling flapper, said pilot-valve connected with the air-supply-passageway in said relay-valve beyond said air-restrictor therein, for regulating the output-air pressure of said relay-valve, said pneumatic-pressure-chamber being connected with the air-output passageway of said relay-valve, and one of said relay-valve diaphragms being subjected to the supply-air and the other to the output-air, an input-pivot carried by the aforesaid pivotally-mounted arm of said transmitter parallel to the axis of pivotation of said arm but spaced therefrom in offset relation thereto, an input-lever pivotally mounted on such offset pivot and having a flapper-operator in operative juxtaposition to the flapper of said pilot-valve.

4. A pneumatic-mechanical converter for converting a pneumatic pressure with mechanical motion, and vice versa, in a predetermined ratio, including a pneumatic pressure-responsive element having a portion thereof stationarily fixed and another portion thereof movable responsive to pneumatic pressure imposed thereon, a balancing spring disposed in operative juxtaposition to and connected with the aforesaid movable portion of said pneumatic element and arranged to oppose its displacement responsive to pneumatic pressure, a fixed stop for the movable portion of said pneumatic element, limiting its movement in the direction of the force of said balancing-spring thereon, and an adjustable stop for mechanically maintaining the movable portion of said pneumatic element in any desired position, within the limit of the adjustability of said adjustable stop, advanced from its aforesaid fixed stop, said adjustable stop including a manually-operable adjusting screw having its axis of rotation disposed transversely of the motion-line of the movable portion of said pneumatic element, and means intermediate said manually-operable adjusting screw and the movable portion of said pneumatic element for translating the movement of said screw into a corresponding motion of said adjustable stop in the direction of the motion-line of the movable portion of said pneumatic element.

References Cited in the file of this patent

UNITED STATES PATENTS

| | | |
|---|---|---|
| 1,546,706 | Bezzenberger | July 21, 1925 |
| 1,827,804 | Tate | Oct. 20, 1931 |
| 1,870,904 | Giesler | Aug. 9, 1932 |
| 1,874,704 | Johnson | Aug. 30, 1932 |
| 1,917,698 | Carson | July 11, 1933 |
| 2,166,603 | Menzer | July 18, 1939 |
| 2,524,446 | Johnson | Oct. 3, 1950 |
| 2,592,501 | Williams | Apr. 8, 1952 |
| 2,623,383 | Bevins | Dec. 30, 1952 |
| 2,628,501 | Knapp | Feb. 17, 1953 |
| 2,663,155 | Strobell | Dec. 22, 1953 |